United States Patent [19]
Lichtenberg et al.

[11] Patent Number: 5,523,995
[45] Date of Patent: Jun. 4, 1996

[54] OPTICAL INFORMATION READ/WRITE SYSTEM WITH A SPREAD PLANE BEAM

[76] Inventors: Heinz D. Lichtenberg, Rte. 1, Box 55; Kai S. Lichtenberg, 301 Woodside Dr., both of, Brenham, Tex. 77833

[21] Appl. No.: 221,846

[22] Filed: Apr. 1, 1994

[51] Int. Cl.$^6$ ............................................. G11B 7/00
[52] U.S. Cl. ........................ 369/120; 369/112; 369/122; 369/44.37; 369/44.42
[58] Field of Search ..................... 369/120, 112, 369/122, 44.37, 44.42; 359/633, 280

[56] References Cited

U.S. PATENT DOCUMENTS

| | | | |
|---|---|---|---|
| 2,093,550 | 9/1937 | Cook | 274/5 |
| 2,923,781 | 2/1960 | Gordon, Jr. et al. | 179/100.3 |
| 4,344,164 | 8/1982 | Bricot et al. | 369/44 |
| 4,449,215 | 5/1984 | Reno | 369/111 |
| 4,520,471 | 5/1985 | Carlin | 369/122 |
| 4,520,472 | 5/1985 | Reno | 369/122 |
| 4,598,393 | 7/1986 | Pierce et al. | 369/122 |
| 4,689,481 | 8/1987 | Ono | 250/201 |
| 4,871,903 | 10/1989 | Carrell | 235/375 |
| 5,028,802 | 7/1991 | Webb et al. | 250/571 |
| 5,144,616 | 9/1992 | Yasukawa et al. | 369/122 |
| 5,151,890 | 9/1992 | Yonekubo | 369/44.110 |
| 5,155,633 | 10/1992 | Grove et al. | 359/633 |
| 5,216,562 | 6/1993 | Luecke et al. | 359/280 |
| 5,223,970 | 6/1993 | Oono et al. | 359/223 |
| 5,359,588 | 10/1994 | Fujita et al. | 369/112 |

*Primary Examiner*—Georgia Y. Epps
*Assistant Examiner*—Kim-Kwok Chu
*Attorney, Agent, or Firm*—Jenkens & Gilchrist

[57] ABSTRACT

An electromagnetic radiation read mechanism for reading data stored optically upon an element having a surface and a plurality of tracks, which mechanism includes a source of electromagnetic radiation; an optical coupling system, which optical coupling system is disposed so as to receive radiation output by the source of electromagnetic radiation and spread it into a plane; a prism, which prism is constructed and disposed so as to receive the plane and redirect it to reflect off of the surface of the element, and which prism is further constructed and disposed so as to receive the reflected plane and to redirect it outward; a multi-element optical sensor, which sensor is disposed so as to receive the redirected reflected plane; and a decoder connected to the multi-element optical sensor so as to receive signals therefrom, which decoder allows parallel data reading of all of the tracks of the element simultaneously.

28 Claims, 1 Drawing Sheet

OPTICAL INFORMATION READ/WRITE SYSTEM WITH A SPREAD PLANE BEAM

BACKGROUND OF THE INVENTION

1. Field of the Invention

The present invention relates generally to apparatus and methods for reading data stored upon an optical medium. More particularly, the present invention relates to apparatus and methods for reading data stored in systems employing optical storage disks, ribbon type media, cylindrical media, drum media, or the like, without limitation.

2. Description of Related Art

Current microcomputer technology is impeded in capability by limitations in the speed at which data in storage media can be assessed. Slow access time is a pronounced problem in optical storage systems, such as CD-ROM drives. Access times in such systems are about 200 milliseconds or more. Because such systems also suffer slow data transfer rates, from about 150 to 450 Kbytes per second, user irritating delays are inevitable.

The access time limitation in prior art optical readers is caused in large part by inertia in mechanical subcomponents, primarily the mechanical arm assembly. Before a prior art optical reader can begin reading, it must overcome the inertia of the mechanical arm assembly. There is an inevitable delay associated with this action, notwithstanding whatever mechanisms are in place to facilitate it.

The fact that prior art systems include mechanical subcomponents such as mechanical arm assemblies introduces other shortcomings and deficiencies. Mechanical components are subject to wear, which can eventually reduce system reliability and which can ultimately lead to system failure. In a worst case situation, mechanical wear can ultimately lead to catastrophic failure, in which all data is lost.

Notwithstanding the shortcomings and deficiencies mentioned above, optical storage mechanisms possess many desirable characteristics. First of all, CDs are dense—up to 660 MBs of information can be stored on a single disk. Second, optical drive technology is mature enough that its performance is predictable and dependable. Third, optical drives are now common enough that prices are relatively low and there is an abundance of stored data. Fourth, optical storage is particularly well suited for video, graphic, and sound files, which are becoming increasingly widely used.

Based on the foregoing, it should be understood and appreciated that optical storage media have a number of strengths. At the same time, those systems include mechanical components that exacerbate weaknesses of the technology, especially access times, and which components are susceptible to damaging wear and ultimate failure.

SUMMARY OF THE INVENTION

The present invention overcomes the shortcomings and deficiencies mentioned above by providing an electromagnetic radiation reader in which reliance upon mechanical parts is substantially reduced (if not eliminated altogether) compared to the prior art. The present invention provides an electromagnetic reader having no mechanical arm mechanism. Because a reader according to the teachings of the present invention lacks such a mechanical arm, access time delays heretofore required to overcome the inertia of such an arm are eliminated. Further, not having a mechanical arm makes a reading mechanism according to the teachings of the present invention less susceptible to wear and ultimate failure than prior art readers.

More specifically, the present invention provides an electromagnetic radiation read mechanism for reading data stored optically upon an element having a surface and a plurality of tracks, which mechanism includes a source of electromagnetic radiation; an optical coupling system, which optical coupling system is disposed so as to receive radiation output by the source of electromagnetic radiation and spread it into a plane; a prism, which prism is constructed and disposed so as to receive the plane and redirect it to reflect off of the surface of the element, and which prism is further constructed and disposed so as to receive the reflected plane and to redirect it outward; a multi-element optical sensor, which sensor is disposed so as to receive the redirected reflected plane; and a decoder connected to the multi-element optical sensor so as to receive signals therefrom, which decoder allows parallel data reading of all of the tracks of the element simultaneously.

Accordingly, an object of the present invention is to provide an ultrafast apparatus and method for reading data stored upon an optical medium.

Another object of the present invention is to provide a highly reliable apparatus and method for reading data stored upon an optical medium.

BRIEF DESCRIPTION OF THE DRAWINGS

Other objects, advantages, and novel features of the present invention will become apparent from the following detailed description of the invention when considered in conjunction with the accompanying drawings in which.

DETAILED DESCRIPTION OF THE INVENTION

Figure 1:
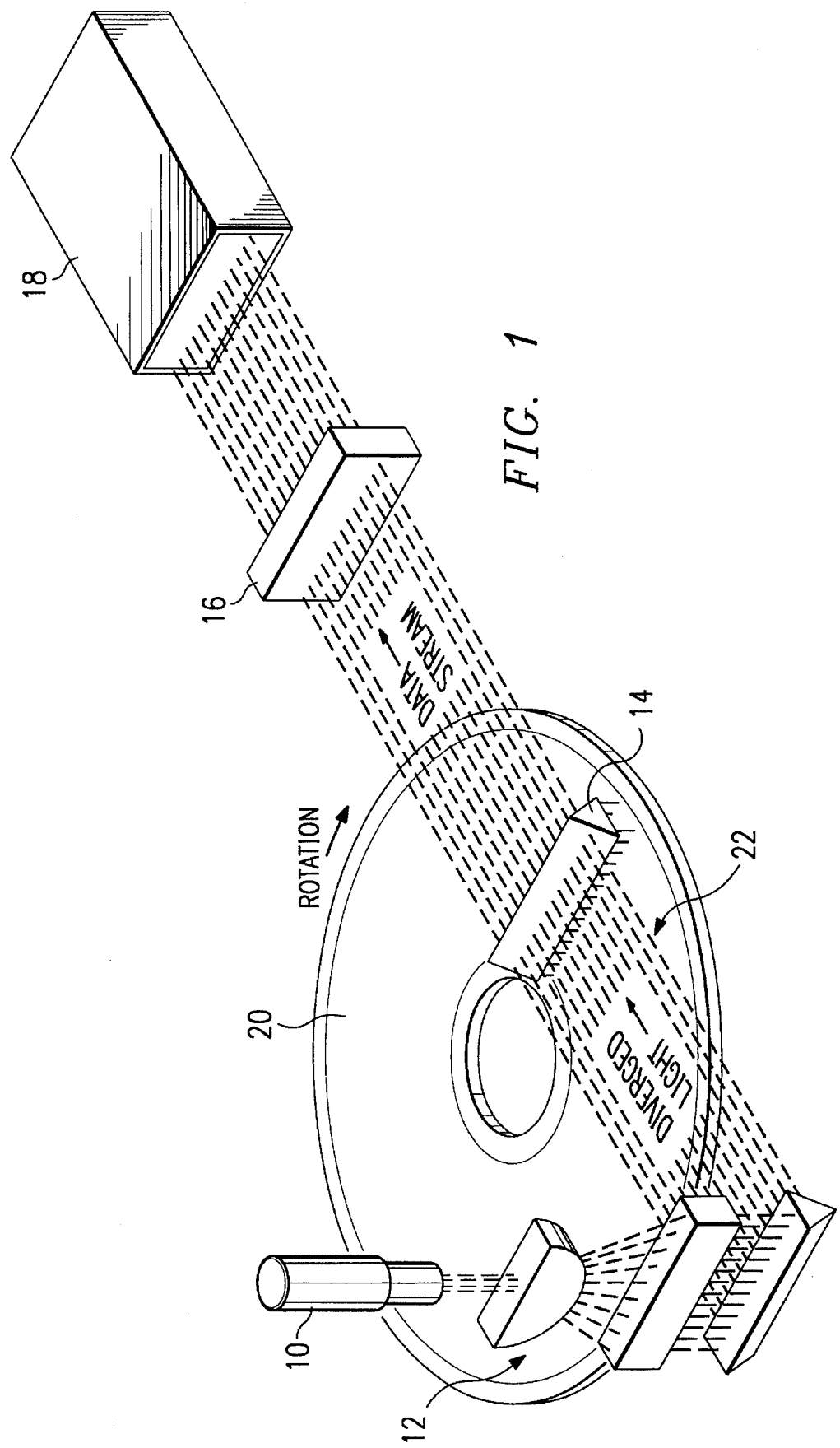
FIG. 1, which is the sole Figure, is a perspective view of an arrangement of components according to the teachings of the present invention.

Referring now to the drawings wherein the elements depicted are not necessarily drawn to scale and, more particularly, to FIG. 1, there is shown a perspective view of select components forming a preferred embodiment of the present invention. Depicted in FIG. 1 are a source of electromagnetic radiation 10, an anamorphic optical system (generally designated by reference numeral 12), a prism 14, a multi-element optical sensor 16, and a decoder 18. Each of these elements is discussed further below.

Before, however, discussing elements 10–18 mentioned above, it should be noted that the preferred embodiment of the present invention depicted in FIG. 1 is a CD-ROM drive or CD reader (of course, as is pointed out several times in this document, embodiments of the present invention need not employ CDs or even rotating media; ribbon type media, cylindrical media, and drum media, among others, may be incorporated or otherwise formed into embodiments of the present invention covered by the appended claims). Thus, a CD 20 is depicted in FIG. 1. As those skilled in the art are well aware, in order to be read CDs must be rotated continuously. Accordingly, underlying the apparatus depicted in FIG. 1 is a conventional CD drive mechanism, including a motor having a rotating output shaft means for temporarily but fixedly connecting the CD 20 to the output shaft for rotation for reading. Since all of these elements are conventional and well known to those skilled in the art, they are not shown in FIG. 1 nor are they described in detail herein. The important point here is that the apparatus depicted in FIG. 1 reads data from an optical disk.

The source of electromagnetic radiation 10 is any one of a number of components known to those skilled in the art which create a raw source of electromagnetic radiation when energized and activated. One example of such a source would be a laser diode.

The source of electromagnetic radiation 10 mentioned above feeds an anamorphic optical system. Those skilled in the art are well familiar with the use of anamorphic optical systems for adjusting laser beam ellipticity, for removing laser beam astigmatism, for beam steering, and the like. This topic is discussed in greater detail in U.S. Pat. No. 5,155,633, the teachings in which are hereby incorporated herein by this reference thereto. The purpose of anamorphic optical system 12 is to receive the output of the source 10, and to spread it into a light plane (labeled "Diverged Light" and marked with reference numeral 22 in FIG. 1). In the particular embodiment of the present invention depicted in FIG. 1, this light plane lies parallel to the upper (data written) surface of CD 20.

Continuing to refer to FIG. 1, it may be seen that the diverged light leaving the anamorphic optical system 12 enters the prism 14. The prism 14 is constructed and disposed so that it redirects the light plane 22 ninety degrees to reflect off the surface of CD 20. Ideally, and as is depicted in FIG. 1, the prism is constructed and disposed so that the redirected light plane strikes all tracks on the CD 20 simultaneously. By doing this, the reflected light plane effectively contains information extracted from each and every track on the CD 20.

The reflected light plane, which, once again, effectively contains data read from the CD 20, is shown in FIG. 1 to then return to the prism 14 whereupon it is redirected onward. This function could be performed by another prism, or multiplicity thereof, or other such optical redirecting means, but it is most efficient and cost effective to have that function performed by the prism 14. The prism 14 redirects the reflected light to the sensor 16.

The sensor 16 is a type of sensor capable of sensing data regarding each separate track from the reflected light plane. This sensor 16 could be, broadly, any of a number of multi-element optical sensors known to those skilled in the art. Along this line, the sensor 16 could be a linear array of optical receivers such as photodiodes or phototransistors or other devices which are responsive to a change in photon density or other electromagnetic flux. There could and should be one sensor per data track. Each sensor would be capable of converting an optical bit extracted from a track to a potential. Thus, output from the sensor 16 would be a parallel stream of potentials reflective of data linearly across all tracks of the CD 20.

The decoder 18 consists of electronic circuitry which can serial or parallel process the data at speeds orders of magnitude faster than the mechanical arm system of present reading mechanisms. Such decoders are well known to those skilled in the art based upon developments in apparatus employed in scanners and the like.

Based upon the foregoing, it should be understood and appreciated that the present invention provides an electromagnetic radiation reader having no mechanical arm mechanism. Because a provided reader lacks such a mechanism, access time delays heretofore required to overcome the inertia associated therewith are eliminated. Further, not having a mechanical arm makes a reader according to the teachings of the present invention less susceptible to wear and ultimate failure than prior art readers. In general, embodiments of the present invention can read all the tracks of a disk (i.e., the entire disk area employed for data storage) simultaneously and can serial or parallel process extracted data at speed orders of magnitude faster than mechanical arm systems of present reading mechanisms.

Obviously, numerous modifications and variations are possible in view of the teachings above. For example, the preferred embodiment of the present invention described hereinabove employs a wholly reflected electromagnetic radiation plane. Alternatively, embodiments of the present invention may use partially reflected data combined with the original beam (i.e., thereby forming a phase modulation or frequency modulation signal rather than an amplitude modulation signal). Embodiments of the present invention may also use a refracted beam formed by passing a light beam through a transparent disk. These types of alternative embodiments all employ beams that "interact" with the media; accordingly, that term is used in certain of the appended claims. Other modifications and variations are possible. Accordingly, within the scope of the appended claims, the present invention may be practiced otherwise than as specifically described hereinabove.

What is claimed is:

1. A method for reading data optically stored upon a recording medium having a plurality of data-containing tracks thereon, said method comprising the steps of:

generating electromagnetic radiation;

directing said electromagnetic radiation to said recording medium;

receiving said electromagnetic radiation after said electromagnetic radiation has interacted with said recording medium; and extracting information from said received, interacted with electromagnetic radiation, which information resides in said electromagnetic radiation plane based upon its interaction with said recording medium; and reading all of said tracks of said recording medium simultaneously.

2. A method as recited in claim 1, wherein said step of extracting information from said received, interacted with electromagnetic radiation comprises the step of parallel processing data from all of said plurality of data-containing tracks of said recording medium simultaneously.

3. A method as recited in claim 1, wherein said step of extracting information from said received, interacted with electromagnetic radiation comprises the step of serial processing data from said plurality of data-containing tracks of said recording medium.

4. An electromagnetic radiation read mechanism for reading data stored optically upon a recording medium having a surface with a plurality of recording tracks thereon, said electromagnetic radiation read mechanism comprising:

source of at least of a single beam of electromagnetic radiation;

an optical coupling system, which optical coupling system is disposed so as to receive radiation output by said source of electromagnetic radiation, which optical coupling system is further disposed so as to spread said received radiation into a plane radiation, and which optical coupling system is still further disposed so as to spread said received radiation into a plane radiation parallel to said surface to said recording medium;

a prism, which prism is constructed and disposed so as to receive said plane radiation and redirect it to reflect off said surface of said recording medium;

a multi-element optical sensor, which multi-element optical sensor is disposed so as to receive said reflected plane; and a decoder connected to said multi-element optical sensor.

5. An electromagnetic radiation read mechanism as recited in claim 4, wherein said optical coupling system comprises an anamorphic optical system.

6. An electromagnetic radiation read mechanism as recited in claim 4, wherein said source of electromagnetic radiation comprises a laser diode.

7. An electromagnetic radiation read mechanism as recited in claim 4, wherein said prism is further constructed and disposed so as to receive said reflected plane and to redirect it outward, and wherein said multi-element optical sensor is further disposed so as to receive said redirected reflected plane.

8. An electromagnetic radiation read mechanism as recited in claim 4, wherein said decoder further allows serial reading of data from said tracks of said element.

9. An electromagnetic radiation read mechanism for reading data optically stored upon a recording medium having an electromagnetic radiation reflective surface with a plurality of data-containing tracks thereon, said electromagnetic radiation read mechanism comprising:

means for generating at least a single beam of electromagnetic radiation;

means for forming said electromagnetic radiation generated by said means for generating electromagnetic radiation into a plane;

means for directing said electromagnetic radiation plane onto said electromagnetic radiation reflective surface of said recording medium;

means for receiving said electromagnetic radiation plane after said electromagnetic radiation plane has reflected off of said electromagnetic radiation reflective surface of said recording medium; and means for extracting information from said received electromagnetic radiation plane, which information resides in said electromagnetic radiation plane based upon interaction of said electromagnetic radiation plane and said surface of said recording medium, wherein said means for generating electromagnetic radiation; said means for forming said electromagnetic radiation generated by said means for generating electromagnetic radiation into a plane; and said means for directing said electromagnetic radiation plane onto said electromagnetic radiation reflective surface of said recording medium are all constructed and disposed so as to manipulate electromagnetic radiation covering all of said plurality of tracks on said surface of said recording medium simultaneously.

10. An electromagnetic radiation read mechanism as recited in claim 9, wherein said means for generating electromagnetic radiation comprises a laser diode.

11. An electromagnetic radiation read mechanism as recited in claim 9, wherein said means for forming said electromagnetic radiation generated by said means for generating electromagnetic radiation into a plane comprises an anamorphic optical system.

12. An electromagnetic radiation read mechanism as recited in claim 9, wherein said means for directing said electromagnetic radiation plane onto said electromagnetic radiation reflective surface of said element is further constructed and disposed so as to receive said reflected plane and to redirect it outward, and wherein said means for receiving said electromagnetic radiation plane after said electromagnetic radiation plane has reflected off of said surface of said element is further disposed so as to receive said redirected reflected light plane.

13. An electromagnetic radiation read mechanism for reading data optically stored upon an element having an electromagnetic radiation reflective surface with a plurality of data-containing tracks thereon, said electromagnetic radiation read mechanism comprising:

means for generating electromagnetic radiation;

means for forming said electromagnetic radiation generated by said means for generating electromagnetic radiation into a plane;

means for directing said electromagnetic radiation plane onto said electromagnetic radiation reflective surface of said element;

means for receiving said electromagnetic radiation plane after said electromagnetic radiation plane has reflected off of said electromagnetic radiation reflective surface of said element; and means for extracting information from said received electromagnetic radiation plane, which information resides in said electromagnetic radiation plane based upon interaction of said electromagnetic radiation plane and said surface of said element, wherein said means for extracting information from said received electromagnetic radiation plane allows parallel reading of all of said plurality of tracks of said element simultaneously.

14. An electromagnetic radiation read mechanism as recited in claim 13, wherein said means for generating electromagnetic radiation comprises a laser diode.

15. An electromagnetic radiation read mechanism as recited in claim 13, wherein said means for extracting information from said received electromagnetic radiation plane further allows serial reading of data from said tracks of said element.

16. An electromagnetic radiation read mechanism as recited in claim 13, wherein said means for forming said electromagnetic radiation generated by said means for generating electromagnetic radiation into a plane comprises an anamorphic optical system.

17. An electromagnetic radiation read mechanism as recited in claim 13, wherein said means for directing said electromagnetic radiation plane onto said electromagnetic radiation reflective surface of said element is further constructed and disposed so as to receive said reflected plane and to redirect it outward, and wherein said means for receiving said electromagnetic radiation plane after said electromagnetic radiation plane has reflected off of said surface of said element is further disposed so as to receive said redirected reflected light plane.

18. An electromagnetic radiation read mechanism for reading data stored optically upon a recording medium having a surface with a plurality of recording tracks thereon, said electromagnetic radiation read mechanism comprising:

a source of at least a single beam of electromagnetic radiation;

an optical coupling system, which optical coupling system is disposed so as to receive radiation output by said source of electromagnetic radiation and further disposed so as to spread said received radiation into a plane radiation:

a prism, which prism is constructed and disposed so as to receive said plane radiation and redirect it to reflect off said surface of said recording medium;

a multi-element optical sensor, which multi-element optical sensor is disposed so as to receive said reflected plane; and a decoder connected to said multi-element optical sensor, which decoder allows parallel data reading of all of said plurality of tracks of said recording medium simultaneously.

19. An electromagnetic radiation read mechanism as recited in claim 18, wherein said source of electromagnetic radiation comprises a laser diode.

20. An electromagnetic radiation read mechanism as recited in claim 18, wherein said optical coupling system comprises an anamorphic optical system.

21. An electromagnetic radiation read mechanism as recited in claim 18, wherein said prism is further constructed and disposed so as to receive said reflected plane and to redirect it outward,
and wherein said multi-element optical sensor is further disposed so as to receive said redirected reflected plane.

22. An electromagnetic radiation read mechanism for reading data stored optically upon a recording medium, having a surface with a plurality of recording tracks thereon, said electromagnetic radiation read mechanism comprising:
  a source of at least a single beam of electromagnetic radiation;
  an optical coupling system, which optical coupling system is disposed so as to receive radiation output by said source of electromagnetic radiation and further disposed so as to spread said received radiation into a plane radiation;
  a prism, which prism is constructed and disposed so as to receive said plane radiation and redirect it to reflect off said surface of said recording medium;
  a multi-element optical sensor, which multi-element optical sensor is disposed so as to receive said reflected plane; and
  a decoder connected to said multi-element optical sensor,
  wherein said optical coupling system, said prism, and said multi-element optical sensor are all constructed and disposed so as to manipulate electromagnetic radiation covering all of said plurality of tracks on said surface of said element simultaneously.

23. An electromagnetic radiation read mechanism as recited in claim 22, wherein said optical coupling system comprises an anamorphic optical system.

24. An electromagnetic radiation read mechanism as recited in claim 22, wherein said prism is further constructed and disposed so as to receive said reflected plane and to redirect it outward, and wherein said multi-element optical sensor is further disposed so as to receive said redirected reflected plane.

25. An electromagnetic radiation read mechanism as recited in claim 22, wherein said source of electromagnetic radiation comprises a laser diode.

26. A method for reading data optically stored upon a recording medium having a surface and a plurality of data-containing tracks thereon, said method comprising the steps of:
  generating electromagnetic radiation;
  directing said electromagnetic radiation to said recording medium;
  spreading said electromagnetic radiation into a plane radiation parallel to said surface of said recording medium;
  receiving said electromagnetic radiation after said electromagnetic radiation has interacted with said recording medium; and
  extracting information from said received, interacted with electromagnetic radiation, which information resides in said electromagnetic radiation plane based upon its interaction with said recording medium.

27. A method as recited in claim 26, wherein said step of extracting information from said received, interacted with electromagnetic radiation comprises the step of parallel processing data from all of said plurality of data-containing tracks of said recording medium simultaneously.

28. A method as recited in claim 26, wherein said step of extracting information from said received, interacted with electromagnetic radiation comprises the step of serial processing data from said plurality of data-containing tracks of said recording medium.

* * * * *

UNITED STATES PATENT AND TRADEMARK OFFICE
CERTIFICATE OF CORRECTION

PATENT NO. : 5,523,995
DATED : Jun. 4, 1996
INVENTOR(S) : Lichtenberg et al.

It is certified that error appears in the above-indentified patent and that said Letters Patent is hereby corrected as shown below:

Column 4, line 55   Before "source"
Insert --a--

Column 6, line 61   Replace "radiation:"
With --radiation;--

Signed and Sealed this

Twenty-first Day of October 1997

Attest:

BRUCE LEHMAN

Attesting Officer    Commissioner of Patents and Trademarks